(12) United States Patent
Dumortier et al.

(10) Patent No.: US 6,834,054 B1
(45) Date of Patent: Dec. 21, 2004

(54) METHOD OF SUPPORTING SHORTCUTS

(75) Inventors: Philip Dumortier, Turnhout (BE); Wim Livens, Reet (BE); Dirk Ooms, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/547,141

(22) Filed: Apr. 11, 2000

(30) Foreign Application Priority Data

Apr. 12, 1999 (EP) .................................. 99440070

(51) Int. Cl.[7] .................... H04L 12/28; H04L 12/56
(52) U.S. Cl. ................. 370/395.5; 370/466; 370/400
(58) Field of Search ...................... 370/389, 395.1, 370/395.5, 395.51, 395.52, 465, 466, 467, 469, 357, 360, 400

(56) References Cited

U.S. PATENT DOCUMENTS

| | | | | |
|---|---|---|---|---|
| 5,828,844 A | * | 10/1998 | Civanlar et al. | ............ 709/228 |
| 6,363,072 B1 | * | 3/2002 | Furuichi | ................ 370/395.52 |
| 6,385,170 B1 | * | 5/2002 | Chiu et al. | .................. 370/235 |

OTHER PUBLICATIONS

Dumortier, "Toward a New IP over AM Routing Paradighm", IEEE Communications Magazine, Jan. 1998,pp. 82–86, XP002115183.

F. Le Faucheur, "IETF Mulitprotocol Label Switching (MPLS) Architecture", IST IEEE International Conference on ATM, ICATM '98 Proceedings of ICATM'98: IEEE International Conference on ATM, Jun. 22, 1998, pp. 6–15, XP002115225.

Boustead, "Label switching and IP Version 6", Proceedings 7TH International Conference on Computer Communications and Networks, Oct. 12, 1998 XP002115184.

Katsube, "Internetworking based on cell switch router— architecture and protocol overview", Proceedings of the IEEE, vol. 85, No. 12, Dec. 12, 1997, pp. 1998–2006, XP002115220.

\* cited by examiner

*Primary Examiner*—Bob Phunkulh
(74) *Attorney, Agent, or Firm*—Sughrue Mion, PLLC

(57) ABSTRACT

The invention relates to a communications network (MPLS-D) with two or more network nodes (ISR1 to ISR3) each provided with a Layer 2 switching element (SW1 to SW3) and a switch controller (SC1 to SC3) for controlling the respective Layer 2 switching element (SW1 to SW3), to such a network node, to such a switch controller, and to a method of supporting shortcuts through such network nodes. The switch controller (SC1) is composed of several independent modules, namely a shortcut control module, at least one trigger module, and at least one protocol module. If respective predetermined criteria are satisfied, the at least one trigger module initiates the assignment of a shortcut, which is formed by a direct Layer 2 connection, to a Layer 3 connection. The shortcut control module communicates with the respective Layer 2 switching element (SW1), initiating the assignment of data packets to shortcuts by marking data packets with a label assigned to the respective shortcut, and controlling the switching of shortcuts through the respective Layer 2 switching element (SW1). The at least one protocol module distributes labels to switch controllers (SC2, SC3) of other network nodes (ISR2, ISR3) of the communications network (MPLS-D) and thereby coordinates the assignment of labels to shortcuts.

12 Claims, 2 Drawing Sheets

METHOD OF SUPPORTING SHORTCUTS

BACKGROUND OF THE INVENTION

This invention relates to a communications network comprising two or more network nodes (ISR1 to ISR3) each provided with a Layer 2 switching element (SW1 to SW3) and a switch controller (SC1 to SC3) for controlling the respective Layer 2 switching element (SW1 to SW3), to a network node as (ISR1) for use in a communications network (MPLS-D comprising two or more network nodes (ISR1 to ISR3) each of which is provided with a Layer 2 switching element (Sw1 to SW3) and a switch controller (SC1 to SC3) for controlling the Layer 2 switching element (SW1 to SW3), to a switch controller for controlling a Layer 2 switching element (SW1) of a network node (ISR1) of a communications network (MPLS-D) comprising two or more network nodes (ISR1 to ISR3), and to a method of supporting shortcuts through a network node of a communications network comprising two or more network nodes (ISR1 to ISR3), with a switch controller (SC1) of the network node controlling a Layer 2 switching element (SW1) of the network node for supporting the shortcut.

The invention is based on a new multilayer routing concept for integrating, e. g., IP (=Internet Protocol) and ATM (=Asynchronous Transfer Mode), the multiprotocol label switching (MPLS) concept. This concept glues the Layer 2 functionality—e.g., ATM switching —and the Layer 3 functionality—e.g., IP routing. Network nodes which follow this concept are referred to as "integrated switch routers". They are composed of a Layer 3 router, a switch controller, and a Layer 2 switch.

One concept for implementing multiprotocol label switching is tag switching. This concept involves the use of routers for path selection. Tags are assigned to flows based on conventional routing information depending on network topology ("topology driven"). The process is not tied to the current traffic situation. In a tag switching network node, two tables must be provided: the normal routing table as is used in routers (IP address to output port), and a forwarding database which maps input tags and input ports to output tags and output ports.

Another concept for implementing multiprotocol label switching is the Ipsilon flow switching concept. The fundamental idea of this concept is to tie the routing intelligence (Layer 3) directly into the ATM switching process of the network nodes. Each data traffic is regarded as a flow. Forwarding decisions in Layer 3 are made only for the first data packets of a flow. The flow is then assigned a short identification and is forwarded at Layer 2.

SUMMARY OF THE INVENTION

The invention has for its object to provide a multilayer routing concept which can be better adapted to the specific requirements of a given communications network and to a particular network situation.

This object is attained by a communications network comprising two or more network nodes each provided with a Layer 2 switching element and a switch controller for controlling the respective Layer 2 switching element, wherein the switch controller is composed of several independent modules, namely a shortcut control module at least one trigger module, and at least one protocol module, that the at least one trigger module is designed to initiate the assignment of a shortcut, which is formed by a direct Layer 2 connection, to a Layer 3 forwarding relationship if respective predetermined criteria are satisfied, that the shortcut control module is designed to communicate with the respective Layer 2 switching element, initiating the assignment of data packets to shortcuts by marking data packets with a label assigned to the respective shortcut, and controlling the switching of shortcuts through the respective Layer 2 switching element, and that the at least one protocol module is designed to distribute labels to switch controllers of other network nodes of the communications network and thereby coordinate the assignment of labels to shortcuts.

The invention further resides in a network node, a switch controller for controlling a Layer 2 switching element, and a method of supporting shortcuts through a network node, for implementing the network described above.

The invention is predicated on recognition that each of the existing concepts is optimized for only one specific trigger event for establishing a Layer 2 connection. Because of the different natures of these concepts, a combination of different trigger mechanisms is not possible. It is therefore proposed to no longer regard the switch controller as a uniform functionality, but to construct it from several independent modules, namely a shortcut control module, at least one trigger module, and at least one protocol module. If respective predetermined criteria are satisfied, the trigger modules initiate the assignment of a shortcut, which is formed by a direct Layer 2 connection, to a Layer 3 forwarding relationship. The shortcut control module communicates with the respective Layer 2 switching element. It initiates the assignment of data packets to shortcuts by marking data packets with a label assigned to the respective shortcut, and controls the switching of shortcuts through the respective Layer 2 switching element. The protocol modules distribute labels to switch controllers of other network nodes of the communications network and thereby coordinate the assignment of labels to shortcuts.

The advantage of the invention lies in the fact that the combination of arbitrary trigger mechanisms within a communications network is made possible. Depending on the current network situation, an optimally adapted trigger mechanism can be used. The decoupling further permits a very simple integration of a plurality of different trigger mechanisms or a correspondingly simple subsequent expansion of network nodes by adding further trigger mechanisms.

Further advantageous aspects of the invention are defined in the subclaims.

Particularly advantageously, different types of trigger modules which provide different trigger mechanisms are provided in one switch controller. This enables different trigger mechanisms to operate in parallel in one network node.

Furthermore, it is particularly advantageous to provide uniform interfaces between the shortcut control modules, trigger modules, and protocol modules. This further reduces the cost and complexity of the software development.

BRIEF DESCRIPTION OF THE DRAWINGS

The invention will become more apparent from the following description of several embodiments when taken in conjunction with the accompanying drawings, in which.

DETAILED DESCRIPTION OF THE INVENTION

Figure 1:
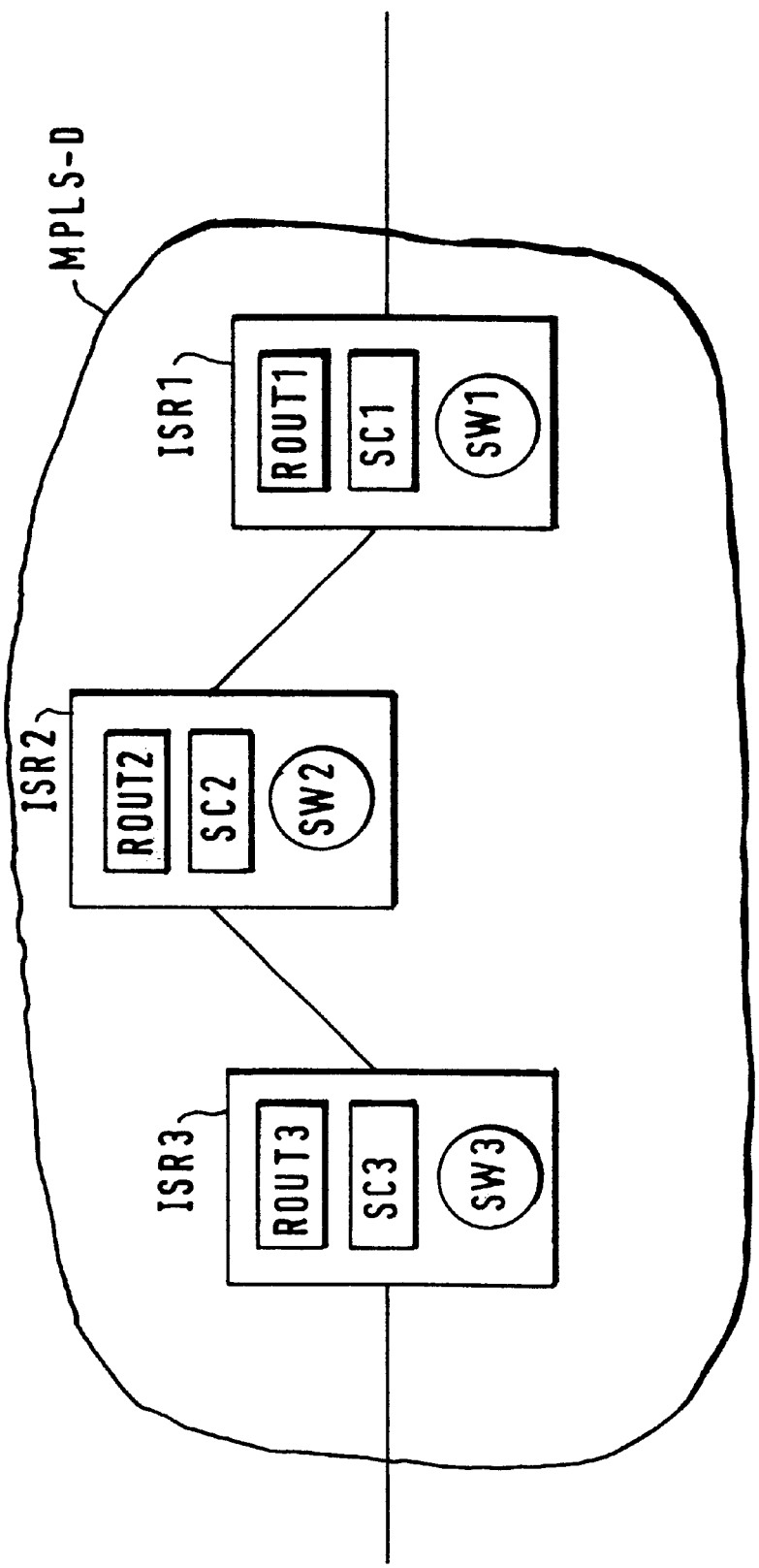
FIG. 1 is a block diagram of a communications network according to the invention with several network nodes according to the invention.

FIG. 1 shows a communications network MPLS-D. The communications network MPLS-D represents a data communications network. It is formed by several interconnected network nodes which together constitute a multiprotocol label switching domain. This domain is characterized by the fact that data assigned to a Layer 3 forwarding relationship can be transported through the domain via a direct Layer 2 connection, also referred to as a "shortcut", thus eliminating the need to perform intermediate Layer 3 forwarding functions.

Of the network nodes of the communications network MPLS-D which perform Layer 3 routing functions, three network nodes ISR1 to ISR3 are shown in FIG. 1 by way of example. The network nodes ISR1 to ISR3 are switch routers. The network node ISR2 is linked to the network nodes ISR1 and ISR3 via Layer 2 connections. The network nodes ISR1 and ISR2 are linked via further Layer 2 connections to network nodes of other communications networks. These network nodes are switch routers of another multiprotocol label switching domain or other network nodes that perform Layer 3 routing functions.

Each of the network nodes ISR1 to ISR3 consists of a hardware platform and a software platform for the application programs for controlling the functions of the respective network node ISR1 to ISR3. From a functional point of view, each of the network nodes ISR1 to ISR3 comprises a Layer 2 switching element SW1, SW2, SW3, a switch controller SC1, SC2, SC3, and a Layer 3 router function ROUT1, ROUT2, ROUT3.

The structure of the network nodes ISR1 to ISR3 will now be explained using the network node ISR1 as an example.

The Layer 3 router function ROUT1 serves the purpose of normal user data communication via Layer 3 routers using the IP protocol (routing and Layer 3 forwarding). It processes the user data communication of those Layer 3 forwarding relationships which have not or not yet been assigned a shortcut.

The Layer 2 switching element SW1 is formed by ATM switching hardware which can route IP packets via ML-5 (AAL=ATM Adoption Layer, IP=Internet Protocol). The usual software for signaling is no longer needed. Instead, the switch controller SC1 controls the hardware.

The invention is not limited to ATM for the Layer 2 protocol or to IP for the Layer 3 protocol, i.e., other Layer 2 or Layer 3 protocols can also be used.

The switch controller SC1 processes the usual routing protocols, but it also communicates with the other switch routers of the communications network MPLS-D by one or more specific protocols. The switch controller SC1 triggers the establishment of shortcuts and controls the marking of data packets with labels as well as the through-switching of such labelled data packets on Layer 2. If ATM is used, the VCI/VPI values can serve directly as labels (VCI=Virtual Channel Identifier, VPI=Virtual Path Identifier). The switch controller SC1 is composed of several independent modules, namely a shortcut control module, at least one trigger module, and at least one protocol module, which cooperate in providing the functions of the switch controller SC1.

The switch controller SC1 and the switch hardware need not necessarily form a unit, but the switch controller can also be operated remote from the switch hardware. The switch hardware, in turn, can form part of a normal ATM switch with normal signaling. Then, however, the two flows must be treated separately; in particular, the ranges of VPI/VCI values for the two types must be preset by management and must not overlap.

The network nodes ISR1 to ISR3 thus process three different forms of communication:

Firstly, normal user data communication via Layer 3 routers. This is performed by the Layer 3 router functions ROUT1 to ROUT3.

Secondly, direct user data communication via Layer 2 switches (shortcuts). If a shortcut exists, the data packets will be marked with a label and, on the basis of the label, be switched directly on Layer 2 through the communications network MPLS-D. The labels are assigned (label push) to the Layer 3 session at the input of the multiprotocol label switching domain (labels can also be pushed/popped within an MPLS domain), for example by the network node ISR1, translated (label swap) in intermediate nodes, for example in the network node ISR2, and removed (label pop) at the output of the multiprotocol label switching domain, for example by the network node ISR3. Direct user data communication is controlled by the switch controllers SC1 to SC3.

Thirdly, internal communication among the switch controllers SC1 to SC3 and with the Layer 2 switching elements SW1, SW2, and SW3, respectively. This communication is necessary to coordinate the association between the forwarding relationships on Layer 3, the IP level, and the labels.

The detailed structure of the switch controllers SC1 to SC3 will now be explained with reference to FIG. 2.

Figure 2:
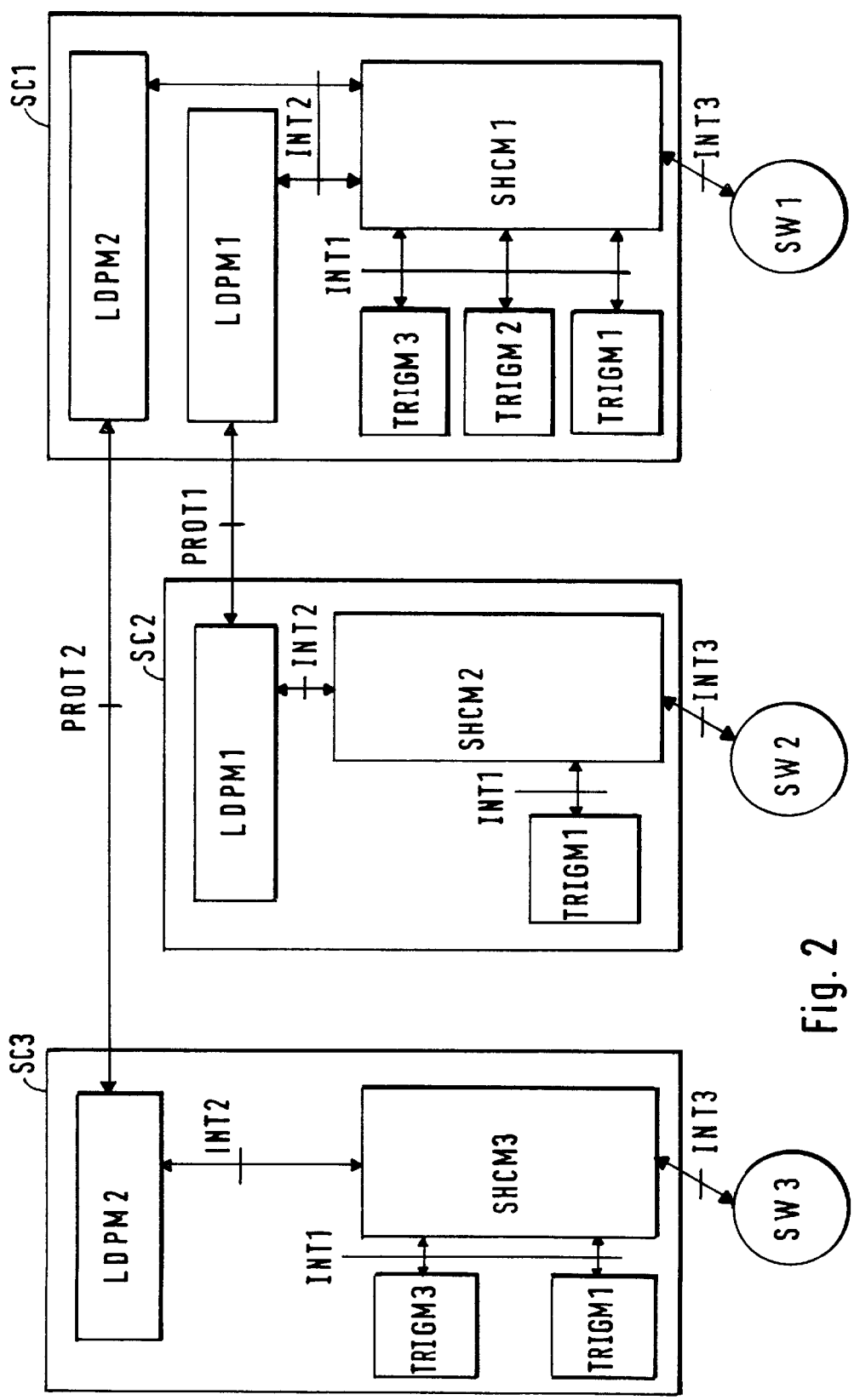
FIG. 2 is a functional diagram of the network nodes of FIG. 1.

FIG. 2 shows the Layer 2 switching elements SW1 to SW3 and the switch controllers SC1 to SC3. Each of the switch controllers SC1 to SC3 is composed of several independent modules.

The switch controller SC1 contains a shortcut control module SHCM1, three trigger modules TRIGM1 to TRIGM3, and two protocol modules LDPM1 and LDPM2. The shortcut control modules SHCM1 is connected to the trigger modules TRIGM1 to TRIGM3 via an interface INT1, to the protocol modules LDPM1 and LDPM2 via an interface INT2, and to the Layer 2 switching element SW1 via an interface INT3.

The switch controller SC2 contains a shortcut control module SHCM2, the trigger module TRIGM1, and the protocol module LDPM1. The shortcut control module SHCM2 is connected to the trigger module TRIGM1 via the interface INT1, to the protocol module LDPM1 via the interface INT2, and to the Layer 2 switching element SW2 via the interface INT3.

The switch controller SC3 contains a shortcut control module SHCM3, the two trigger modules TRIGM1 and TRIGM3, and the protocol module LDPM2. The shortcut control module SHCM3 is connected to the trigger modules TRIGM1 and TRIGM3 via the interface INT1, to the protocol module LDPM2 via the interface INT2, and to the switching element SW3 via the interface INT3. In the following, the structure of the switch controllers SC1 to SC3 will be explained using the switch controller SC1 as an example.

The function of the trigger modules TRIGM1 to TRIGM3 is to initiate the assignment of a shortcut, which is formed by a direct Layer 2 connection, to a Layer 3 forwarding relationship if respective predetermined criteria are satisfied. To accomplish this, the trigger modules TRIGM1 to TRIGM3 access data contained in the switch router ISR1 via the shortcut control module SHCM1, compare these data, or a change in these data, with predetermined criteria, and, if these criteria are satisfied, initiate the assignment of a shortcut to a Layer 3 forwarding relationship by sending a corresponding control message to the shortcut control module SHCM1.

The trigger modules TRIGM1 to TRIGM3 represent different types of trigger modules which initiate the assignment of a shortcut based on different trigger criteria. The switch controller SC1 may, of course, comprise further trigger modules which initiate the assignment of a shortcut based on other trigger criteria. If two or more trigger modules are connected to one and the same shortcut control module, it is possible for the trigger modules to initiate shortcuts independently of each other or to cooperate in initiating the shortcuts, the initiation being dependent, for example, on the status of the other trigger modules. This coordination may also be provided by the shortcut control module.

The trigger module TRIGM1 initiates shortcuts depending on network topology. To do this, the trigger module TRIGM1 accesses, via the shortcut control module SHCM1, the IP routing tables which map the Layer 3 topology of the communications network MPLS-D. It is also possible for the trigger module TRIGM1 to access the routing tables directly. If the trigger module TRIGM1 detects a change in this topology, particularly the creation of a new route, it will initiate the establishment and assignment of a new shortcut or the assignment of an existing shortcut to this connection by sending a corresponding initiation message to the shortcut control module SHCM1. It is also possible for the trigger module TRIGM1 to initiate the assignment of a shortcut only on particular changes in topology or only on changes in topology lasting for the given period of time.

The trigger module TRIGM2 initiates shortcuts depending on traffic. To do this, the trigger module TRIGM2 accesses to information about the Layer 2 flow, and thus to information about the packets themselves, via the shortcut control module SHCM1 and the Layer 2 switching elements SW1. It is also possible for the trigger module TRIGM2 to access the Layer 2 switching element SW1 directly. If a flow is detected by means of this information, a shortcut will be initiated for the corresponding Layer 3 forwarding relationship. It is also possible to initiate a shortcut only if, for example, the bandwidth of a detected flow exceeds a predetermined threshold.

The trigger module TRIGM3 initiates shortcuts in response to signaling requests ("request-driven"). To accomplish this, the trigger module TRIGM3 monitors, via the shortcut control module SHCM1, control signals which are routed through the switch router ISR1. It thus monitors the flow of signaling messages associated with a specific control protocol, and initiates the establishment of shortcuts if it detects specific signaling messages. It is also possible for the trigger module TRIGM3 to access the protocol data unit of the respective protocol direct. The trigger module TRIGM3 monitors, for example, the message flow of the Resource Reservation Protocol (RSVP), and initiates the assignment of shortcuts to Layer 3 forwarding relationships if a corresponding bandwidth reservation is made via the RSVP. It is also possible for the trigger module TRIGM3 to monitor a multicast signaling protocol.

The switch controller SC1 may, of course, contain other numbers of trigger modules or further trigger modules which initiate the assignment of a shortcut based on other trigger criteria.

The interface INT1, via which the trigger modules TRIGM1 to TRIGM3 and the shortcut control module SHCM1 communicate with each other, represents a uniform interface for all trigger modules and shortcut control modules of the network nodes of the communications network MPLS-D. This interface is characterized by a uniform protocol for the communication between a trigger module and a shortcut control module. Thus it is readily possible to replace trigger modules and to connect a shortcut control module with two or more different trigger modules. The interface INT1 may also represent a standard application program interface (API) via which the trigger modules can be linked with a shortcut control module.

The shortcut control module SHCM1 communicates with the Layer 2 switching element SW1. On the one hand, it initiates the assignment of data packets to shortcuts. On the other hand, it controls the switching of shortcuts through the Layer 2 switching element SW1. The communication with the Layer 2 switching element SW1 is governed, for example, by the generic switch management protocol (GSMP). Furthermore, the shortcut control module SHCM1 performs the resource management and manages, for example, the assignment of labels to shortcuts. For the resource management, the coordination of the label assignment, and the setting up of shortcuts through the communications network MPLS-D, the shortcut control module SHCM1 interacts with the shortcut control modules of the other switch routers of the communications network MPLS-D via the protocol modules LDPM1 and LDPM2. The switch controler SC1 thus communicates with different switch routers of the communications network MPLS-D using different protocols. To accomplish this, the shortcut control module SHCM1 includes a database which specifies via which protocol, and thus via which of the protocol modules LDPM1 and LDPM2, the shortcut control modules of the other switch routers of the communications network MPLS-D can be reached. Peer nodes may communicate using more than one protocol.

The function of each of the protocol modules LDPM1 and LDPM2 is to distribute labels to switch controllers of other network nodes of the communications network MPLS-D and thereby coordinate the assignment of labels to shortcuts. To do this, the protocol modules LDPM1 and LDPM2 communicate with the corresponding protocol modules LDPM1 and LDPM2 of the other switch routers of the communications network MPLS-D using a first protocol PROT1 and a second protocol PROT2, respectively. The protocols PROT1 and PROT2 are different label distribution protocols. Possible protocols are, e.g., LDP and RSVP. It is also possible, of course, to use only one protocol for communication between the switch routers in the communications network MPLS-D or to use further protocols for this communication in parallel.

The interface INT2, via which the protocol modules LDPM1 and LDPM2 and the shortcut control module SHCM1 communicate with each other represents a uniform interface for all protocol modules and shortcut control modules of the network nodes of the communications network MPLS-D. This interface is characterized by a uniform protocol for communication between a protocol module and a shortcut control module. Thus, the protocol modules connected with a shortcut control module can be replaced in a simple manner. The interface INT2 may also represent a standard application program interface (API) via which protocol modules can be linked with a shortcut control module.

What is claimed is:

1. A communications network (MPLS-D) comprising two or more network nodes (ISR1 to ISR3) each provided with a Layer 2 switching element (SW1 to SW3) and a switch controller (SC1 to SC3) for controlling the respective Layer 2 switching element (SW1 to SW3), characterized in that the switch controller (SC1) is composed of several independent modules, namely a shortcut control module (SHCM1), at least one trigger module (TRIGM1 to TRIGM3), and at least one protocol module (LDPM1 to LDPM2), that the at least one trigger module (TRIGM1 to TRIGM3) is designed to initiate the assignment of a shortcut, which is formed by a direct Layer 2 connection, to a Layer 3 forwarding relationship if respective predetermined criteria are satisfied, that the shortcut control module (SHCM1) is designed to communicate with the respective Layer 2 switching element (SW1), initiating the assignment of data packets to shortcuts by marking data packets with a label assigned to the respective shortcut, and controlling the switching of shortcuts through the respective Layer 2 switching element (SW1), and that the at least one protocol module (LDPM1 to LDPM2) is designed to distribute labels to switch controllers (SC2, SC3) of other network nodes (ISR2, ISR3) of the communications network (MPLS-D) and thereby coordinate the assignment of labels to shortcuts.

2. A communications network (MPLS-D) as claimed in claim 1, characterized in that the trigger modules (TRIGM1 to TRIGM3) and the shortcut control modules (SHCM1 to SHCM3) of each of the network nodes (ISR1 to ISR3) are designed to communicate with each other via a uniform interface (INT1) for all trigger modules and shortcut modules.

3. A communications network (MPLS-D) as claimed in claim 1, characterized in that the switch controller (SC1) comprises different types of trigger modules (TRIGM1 to TRIGM3).

4. A communications network (MPLS-D) as claimed in claim 1, characterized in that network nodes (ISR1 to ISR3) whose switch controllers (SC1 to SC3) communicate with each other through their respective protocol modules (LDPM1, LDPM2) comprise different types of trigger modules (TRIGM1 to TRIGM3).

5. A communications network (MPLS-D) as claimed in claim 1, characterized in that a first type of trigger modules (TRIGM1) initiates shortcuts depending on network topology.

6. A communications network (MPLS-D) as claimed in claim 1, characterized in that a second type of trigger modules (TRIGM2) initiates shortcuts depending on traffic.

7. A communications network (MPLS-D) as claimed in claim 1, characterized in that a third type of trigger modules (TRIGM3) initiates shortcuts depending on signaling requests.

8. A communications network (MPLS-D) as claimed in claim 1, characterized in that the protocol modules (LDPM1, LDPM2) and the shortcut control modules (SHCM1 to SHCM3) of each of the network nodes are designed to communicate with each other via a uniform interface (INT2) for all protocol modules and shortcut control modules.

9. A communications network (MPLS-D) as claimed in claim 3, characterized in that the switching controller (SC 1) comprises two or more different types of protocol modules (LDPM2, LDPM2) which are designed to communicate with different network nodes (SC2, SC3) of the communications network (MPLS-D) using different protocols (PROT1, PROT2).

10. A network node (ISR1) for use in a communications network (MPLS-D) comprising two or more network nodes (ISR1 to ISR3) each of which is provided with a Layer 2 switching element (SW1 to SW3) and a switch controller (SC1 to SC3) for controlling the Layer 2 switching element (SW1 to SW3), characterized in that the switch controller (SC I) is composed of several independent modules, namely a shortcut control module (SHCM1), at least one trigger module (TRIGM1 to TRIGM3), and at least one protocol module (LDPM1 to LDPM2), that the at least one trigger module (TRIGM1 to TRIGM3) is designed to initiate the assignment of a shortcut, which is formed by a direct Layer 2 connection, to a Layer 3 forwarding relationship if respective predetermined criteria are satisfied, that the shortcut control module (SHCM1) is designed to communicate with the respective Layer 2 switching element (SW1), initiating the assignment of data packets to shortcuts by marking data packets with a label assigned to the respective shortcut, and controlling the switching of shortcuts through the respective Layer 2 switching element (SW1), and that the at least one protocol module (LDPM1 to LDPM2) is designed to distribute labels to switch controllers (SC2, SC3) of other network nodes (ISR2, ISR3) of the communications network (MPLS-D) and thereby coordinate the assignment of labels to shortcuts.

11. A switch controller (SC1) for controlling a Layer 2 switching element (SW1) of a network node (ISR1) of a communications network (MPLS-D) comprising two or more network nodes (ISR1 to ISR3), characterized in that the switch controller (SC1) is composed of several independent modules, namely a shortcut control module (SHCM1), at least one trigger module (TRIGM1 to TRIGM3), and at least one protocol module (LDPM1 to LDPM2), that the at least one trigger module (TRIGM1 to TRIGM3) is designed to initiate the assignment of a shortcut, which is formed by a direct Layer 2 connection, to a Layer 3 forwarding relationship if respective predetermined criteria are satisfied, that the shortcut control module (SHCM1) is designed to communicate with the respective Layer 2 switching element (SW1), initiating the assignment of data packets to shortcuts by marking data packets with a label assigned to the respective shortcut, and controlling the switching of shortcuts through the respective Layer 2 switching element (SW1), and that the at least one protocol module (LDPM1 to LDPM2) is designed to distribute labels to switch controllers (SC2, SC3) of other network nodes (ISR2, ISR3) of the communications network (MPLS-D), and thereby coordinate the assignment of labels to shortcuts.

12. A method of supporting shortcuts through a network node (ISR1) of a communications network (MPLS-D) comprising two or more network nodes (ISR1 to ISR3), with a switch controller (SC1) of the network node controlling a Layer 2 switching element (SW1) of the network node for supporting the shortcut, characterized in that several independent modules, namely a shortcut control module (SHCM1), at least one trigger module (TRIGM1 to TRIGM3), and at least one protocol module (LDPM1 to LDPM2), cooperate in providing the function of the switch controller (SC1), that, if respective predetermined criteria are met, the at least one trigger module (TRIGM1 to TRIGM3) initiates the assignment of a shortcut, which is formed by a direct Layer 2 connection, to a Layer 3 forwarding relationship, that the shortcut control module (SHCM1) communicates with the Layer 2 switching element (SW1), initiating the assignment of data packets to shortcuts by marking data packets with a respective label assigned to the shortcut, and controlling the switching of shortcuts through the Layer 2 switching element (SW1), and that the at least one protocol module (LDPM1 to LDPM2) distributes labels to switch controllers (SC2, SC3) of other network nodes (ISR2, ISR3) of the communications network (MPLS-D) and thereby coordinates the assignment of labels to shortcuts.

* * * * *